US006876755B1

(12) United States Patent  
Taylor et al.

(10) Patent No.: US 6,876,755 B1  
(45) Date of Patent: Apr. 5, 2005

(54) FACE SUB-SPACE DETERMINATION

(75) Inventors: Christopher J. Taylor, Stockport (GB); Timothy F. Cootes, Stockport (GB); Gareth Edwards, Buxton (GB); Nicholas P. Costen, Sale Moor (GB)

(73) Assignee: The University of Manchester, Manchester (GB)

( * ) Notice: Subject to any disclaimer, the term of this patent is extended or adjusted under 35 U.S.C. 154(b) by 0 days.

(21) Appl. No.: 09/857,044

(22) PCT Filed: Nov. 29, 1999

(86) PCT No.: PCT/GB99/03953

§ 371 (c)(1),  
(2), (4) Date: Aug. 14, 2001

(87) PCT Pub. No.: WO00/33240

PCT Pub. Date: Jun. 8, 2000

(30) Foreign Application Priority Data

Dec. 2, 1998 (GB) ............................................. 9826398  
Sep. 28, 1999 (GB) ............................................. 9922807

(51) Int. Cl.[7] ............................................... G06K 9/00  
(52) U.S. Cl. ...................... 382/115; 382/117; 382/118; 382/282; 340/5.81; 340/5.83  
(58) Field of Search ................................ 382/115, 117, 382/118, 217, 219, 278, 282, 284, 209, 218; 340/5.81, 5.82, 5.83, 5.52, 5.53

(56) References Cited

U.S. PATENT DOCUMENTS

| | | | | |
|---|---|---|---|---|
| 5,774,576 A | * | 6/1998 | Cox et al. | 382/160 |
| 5,867,587 A | * | 2/1999 | Aboutalib et al. | 382/117 |
| 5,991,429 A | * | 11/1999 | Coffin et al. | 382/118 |
| 6,009,209 A | * | 12/1999 | Acker et al. | 382/275 |
| 6,332,033 B1 | * | 12/2001 | Qian | 382/124 |

OTHER PUBLICATIONS

Graham D B et al.: "Face recognition from unfamiliar views: subspace methods and pose dependency" Proceedings Third IEEE International Conference on Automatic Face and Gesture Recognition (Cat. No. 98EX107), Proceedings Third IEEE International Conference on Automatic Face and Gesture Recognition, Nara, Japan, Apr. 1998, pp. 348–353, 1998, Los Alamitos, CA, USE, IEEE Comput. Soc, USA.

Moghaddam B et al.: "Beyond eigenfaces: probabilistic matching for face recognition" Proceedings Third IEEE International Conference on Automatic Face and Gesture Recognition (Cat. No. 98EX107), Proceedings Third IEEE International Conference on Automatic Face and Gesture Recognition, Nara, Japan, Apr. 1998, pp. 30–35, 1998, Los Alamitos, CA, USE, IEEE Comput. Soc, USA.

Duvdevani–Bar S et al.: "A similarity–based method for the generalization of face recognition over pose and expression" Proceedings Third IEEE International Conference on Automatic Face and Gesture Recognition (Cat. No. 98EX107), Proceedings Third IEEE International Conference on Automatic Face and Gesture Recognition, Nara, Japan, Apr. 1998, pp. 118–123, 1998, Los Alamitos, CA, USE, IEEE Compt. Soc. USA.

Costen et al, "Simultaneous Extraction of Functional Face Subspaces", Department of Medical Biophysics, University of Manchester, Manchester, England, Proc. IEEE CVPR 1999, vol. 1, pp. 492–497, 1999.

* cited by examiner

*Primary Examiner*—Bhavesh M. Mehta  
*Assistant Examiner*—Yosef Kassa  
(74) *Attorney, Agent, or Firm*—Nixon & Vanderhye P.C.

(57) ABSTRACT

A method of determining face sub-spaces includes making initial estimates of the sub-spaces, for example lighting, pose, identity and expression, using Principle Component Analysis on appropriate groups of faces. An iterative algorithm is applied to image codings to maximize the probability of coding across these non-orthogonal sub-spaces, obtaining the projection on each sub-space, and recalculating the spaces.

5 Claims, 4 Drawing Sheets

FACE SUB-SPACE DETERMINATION

BACKGROUND OF THE INVENTION

1. Field of the Invention

The present invention relates to the determination of sub-spaces of facial variations.

2. Related Art

Facial variation can be conceptually divided into a number of 'functional' sub-spaces; types of variation which reflect useful facial dimensions [M. J. Black, D. J. Fleet, and Y. Yacoob. A framework for modelling appearance change in image sequences. 6th ICCV, pages 660–667, 1998.]. A possible selection of these face-spaces is: identity, expression (here including all transient plastic deformations of the face), pose and lighting. Other spaces may be extracted, the most obvious being age. When designing a practical face-analysis system, one at least of these sub-spaces must be isolated and modelled. For example, a security application will need to recognise individuals regardless of expression, pose and lighting, while a lip-reader will concentrate only on expression. In certain circumstances, accurate estimates of all the sub-spaces are needed, for example when 'transferring' face and head movements from a video-sequence of one individual to another to produce a synthetic sequence.

Although face-images can be fitted adequately using an appearance-model space which spans the images, it is not possible to linearly separate the different sub-spaces [S. Duvdevani-Bar, S. Edelman, A. J. Howell, and H. Buxton. A similarity-based method for the generalisation of face recognition over pose and expression. 3rd Face and Gesture, pages 118–123, 1998]. This is because the sub-spaces include some degree of overlap (for example, a 'neutral' expression will actually contain a low-intensity expression).

BRIEF SUMMARY OF THE INVENTION

It is an object of the invention to provide an improved method of determining face sub-spaces.

According to a first aspect of the invention there is provided a method of determining face sub-spaces, the method comprising making initial estimates of the sub-spaces, for example lighting, pose, identity and expression, using Principle Component Analysis on appropriate groups of faces, applying an iterative algorithm to image codings to maximise the probability of coding across these non-orthogonal sub-spaces, obtaining the projection on each sub-space, and recalculating the spaces.

The invention simultaneously apportions image weights between initial overlapping estimates of these functional spaces in proportion with the sub-space variance. This divides the faces into a set of non-orthogonal projections, allowing an iterative approach to a set of pure, but overlapping, spaces. These are more specific than the initial spaces, improving identity recognition.

According to a second aspect of the invention there is provided a method of determining face sub-spaces, the method comprising:

a. generating a first series of initial images in which a first predetermined facial property is modified, b. generating a second series of initial images in which a second predetermined facial property is modified, c. coding each series of images according to the variance of the images to obtain an estimated sub-space for each facial property, d. concatenating the sub-spaces to provide a single over-exhaustive space, e. approximating each image of the first and second series on the over-exhaustive space to obtain approximated versions of each image on each estimated property sub-space, f. generating overall approximated versions of each image on the whole over-exhaustive space, g. comparing the overall approximated version of each image with the initial image to determine an error value for each image, h. sub-dividing the error value for each image into a sub-error for each estimated property sub-space in proportion to the variance of that sub-space, i. combining each sub-error for each image with the approximated version of that image on the estimated property sub-space, to obtain a new approximated version in the property sub-space for each image, j. coding the new approximated versions of the images according to their variance to obtain new estimated sub-spaces.

The method according to the second aspect of the invention preferably further comprises approximating each image on the new estimated sub-spaces as described in steps 'a' to 'j' and then repeating steps 'd' to 'j' until the subspaces have stabilised.

Preferably, three or more series of images are generated, a different predetermined facial property being modified in each series.

Preferably, the predetermined facial properties are categorised as at least some of identity, expression, pose, lighting and age.

Preferably, at least one further series of images is generated, a further predetermined facial property being modified in the series.

BRIEF DESCRIPTION OF THE DRAWINGS

A specific embodiment of the invention will now be described by way of example only, with reference to the accompanying drawings, in which.

DETAILED DESCRIPTION OF EXEMPLARY EMBODIMENTS

Figure 1:
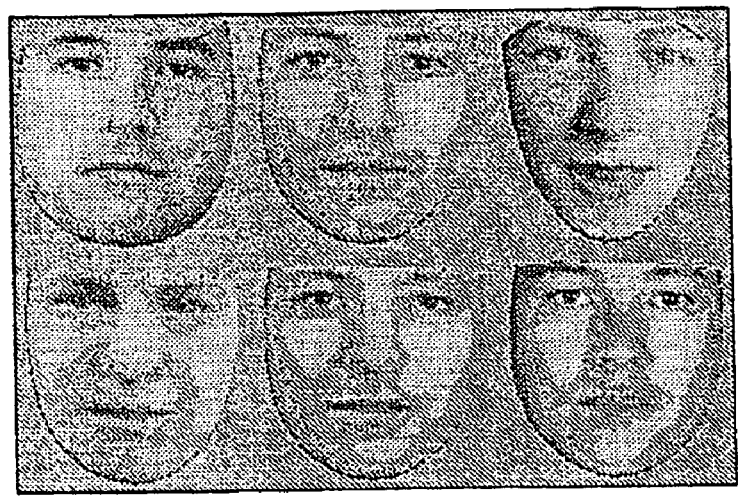
FIG. 1 shows the first two dimensions of a face-space as defined by an appearance model used by the invention.

Facial coding requires the approximation of a manifold, or high dimensional surface, on which any face can be said to lie. This allows accurate coding, recognition and reproduction of previously unseen examples. A number of previous studies [N. P. Costen, I. G. Craw, G. J. Robertson, and S. Akamatsu. Automatic face recognition: What representation? European Conference on Computer Vision, vol 1, pages 504–513, 1996; G. J. Edwards, A. Lanitis, C. J. Taylor, and T. F. Cootes. Modelling the variability in face images. 2nd Face and Gesture, pages 328–333, 1996; N. P. Costen, I. G. Craw, T. Kato, G. Robertson, and S. Akamatsu. Manifold caricatures: On the psychological consistency of computer face recognition. 2nd Face and Gesture, pages 4–10, 1996.] have suggested that using a shape-free coding provides a ready means of doing this, at least when the range of pose-angle is relatively small, perhaps ±20° [T. Poggio and D. Beymer. Learning networks for face analysis and synthesis. Face and Gesture, pages 160–165, 1995.]. In this embodiment of the invention, the correspondence problem between faces is first solved by finding a pre-selected set of distinctive points (corners of eyes or mouths, for example) which are present in all faces. This is typically performed by hand during training. Those pixels thus defined as being part of the face can be warped to a standard shape by standard grey-level interpolation techniques, ensuring that the image-wise and face-wise co-ordinates of a given image are equivalent. If rigid transformation to remove scale, location and orientation effects is performed on the point-locations, they can then be treated in the same way as the grey-levels, as again identical values for corresponding points on different faces will have the same meaning.

Although these operations linearise the space, allowing interpolation between pairs of faces, they do not give an estimate of the dimensions. Thus, the acceptability as a face of an object cannot be measured; this reduces recognition [N. P. Costen, I. G. Craw, G. J. Robertson, and S. Akamatsu. Automatic face recognition: What representation? European Conference on Computer Vision, vol 1, pages 504–513, 1996]. In addition, redundancies between feature-point location and grey-level values cannot be described. Both these problems are addressed in this embodiment of the invention by Principal Components Analysis (PCA). This extracts a set of orthogonal eigenvectors $\phi$ from the covariance matrix of the images (either the pixel grey-levels, or the featurepoint locations). Combined with the eigenvalues, this provides an estimate of the dimensions and range of the face-space. The weights w of a face q can then be found, $$w = \phi^T (q - \bar{q}) \qquad (1)$$

and this gives the Mahalanobis distance between faces q1 and q2, coding in terms of expected variation [B. Moghaddam, W. Wahid, and A. Pentland. Beyond eigenfaces: Probabilistic matching for face recogntion. 3rd Face and Gesture, pages 30–35, 1998]. Redundancies between shape and grey-levels are removed by performing separate PCAs upon the shape and grey-levels, before the weights of the ensemble are combined to form single vectors on which second PCA is performed [G. J. Edwards, A. Lanitis, C. J. Taylor, and T. F. Cootes. Modelling the variability in face images. 2nd Face and Gesture, pages 328–333, 1996.].

This 'appearance model' allows the description of the face in terms of true variation—the distortions needed to move from one to another. The following studies are performed embedded within this representation. However, it will code the entire space as specified by our set of images, as can be seen in FIG. 1 (from the left,—2s:d:, the mean +2s:d). The eigenfaces vary on identity, expression, pose and lighting. Thus, for example, the distance between the representations of two images will be a combination of the identity, facial expression, angle and lighting conditions. These must be separated to allow detailed analysis of the face image.

Although estimates of the sub-spaces might be gained from external codes of every face on each type of variation, these are typically not available. Rather, different sets, each showing major variation on one sub-space alone were used. The sets comprised:

1. A lighting set, consisting of 5 images of a single, male individual, all photographed fronto-parallel and with a fixed, neutral expression. The sitter was lit by a single lamp, moved around his face.
2. A pose set, comprising 100 images of 10 different sitters, 10 images per sitter. The sitters had pointed their heads in a variety of two-dimensional directions, of relatively consistent angle. Expression and lighting changes were minimal.
3. An expression set, with 397 images of 19 different sitters, each making seven basic expressions: happy, sad, afraid, angry, surprised, neutral and disgusted. These images showed notable person-specific lighting variation, and some pose variation.
4. An identity set, with 188 different images, one per sitter. These were all fronto-parallel, in flat lighting and with neutral expressions. However, as is inevitable with any large group of individuals, there was considerable variation in the apparent expression adopted as neutral.

Figure 2:
FIG. 2 is an example of an ensemble image from an expression set, as used by the invention, showing the correspondence points.

All the images had a uniform set of 122 landmarks found manually. An example of an ensemble image with landmarks is shown in FIG. 2. A triangulation was applied to the points, and bilinear interpolation was used to warp the images to a standard shape and size which would yield a fixed number of pixels. For testing purposes, the feature points were found using a multi-resolution Active Appearance Model constructed using the ensemble images, but without grey-level normalisation [T. F. Cootes, G. J. Edwards, and C. J. Taylor. Active Appearance Models. European Conference on Computer Vision, vol 2, pages 484–498, 1998.].

Since the images were gathered with a variety of cameras, it was necessary to normalise the lighting levels. For a given pixel, a grey-level of, say, 128=256 has a different meaning in one shape-normalised image from another. The shape-free grey level patch $g_i$ was sampled from the $i^{th}$ shape-normalised image. To minimise the effect of global lighting variation, this patch was normalised at each point j to give $$g'_{ij} = \frac{(g_{ij} - \mu_j)}{\sigma_j} \qquad (3)$$

where $\mu_j$, $\sigma_j$ are the mean and standard deviation.

These operations allowed the construction of an appearance model [G. J. Edwards, A. Lanitis, C. J. Taylor, and T. F. Cootes. Modelling the variability in face images. 2nd Face and Gesture, pages 328–333, 1996] coding 99.5% of the variation in the 690 images, each with 19826 pixels in the face area. This required a total of 636 eigenvectors.

Tests showed that the different sub-spaces were not linearly separable. An attempt was made to successively project the faces though the spaces defined by the other categories of faces and take the coding error as the data for a subsequent principal component analysis (PCA), but this was not sucessful. The fourth and final set of components consistently coded little but noise. A procedure where each sub-space removed only facial codes within it's own span (typically ±2S.D.) did produce a usable fourth set, but the application was essentially arbitrary, and only used a small sub-set to calculate each sub-space.

Figure 3:
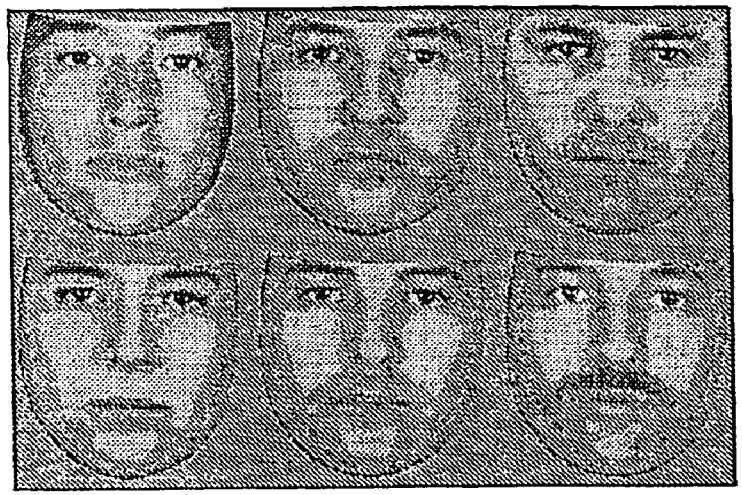
FIG. 3 shows the first two dimensions of starting identity eigenfaces used by the invention.

The relevant data was instead extracted in a more principled manner, using the relevant variation present in each image-set. The basic problem was that each of the sub-spaces specified by the ensembles coded both the desired, 'official' variance, and an unknown mixture of the other types. This contamination stemmed mostly from a lack of control of the relevant facial factors, so for example, the 'neutral' expressions seen in the identity set actually contained a range of different, low-intensity expressions. Examples of the starting identity eigenfaces are shown in FIG. 3, showing the limited identity span of this ensemble (from the left, −2s:d:, the mean +2s:d:). The eigenfaces vary mostly on identity and lighting.

There is no guarantee that the desired, 'pure' principal components for sub-space will be orthogonal with the others. This follows from the ultimate linking factors, notably the three-dimensional face shape and the size and location of facial musculature. Significant improvements in tracking and recognition are possible by learning the path through face-space taken by sequence of face-images [D. B. Graham and N. M. Allinson. Face recognition from unfamiliar views: Subspace methods and pose dependency. 3rd Face and Gesture, pages 348–353, 1998]. The invention stems from the realisation that these relationships may be susceptible to second order modelling, and that the estimates of the modes of variation given by the ensembles will be biased by the selection of images. Thus, the invention allows the removal of the contaminating variance from the non-orthogonal estimates of sub-spaces, and also the use of the largest possible number of images. This is done by using the differences in variance on the principal components extracted from the various ensembles.

Assuming that the ensembles predominately code the intended types of variance, the eigenvalues for the 'signal' components of the variance should be larger than those of the 'noise' components of the variance. The 'signal' components of the variance should also be somewhat more orthogonal to one another than the 'noise' components, and should certainly be less affected by minor changes in the ensembles which create them.

The invention obtains improved values of variance components by coding images on over-exhaustive multiple sub-spaces in proportion to their variance, then approximating the images on the separate sub-spaces and recalculating the multiple spaces. This process is iterated to obtain a set of stable, and rather more orthogonal, sub-spaces which code only the desired features.

If $n_s$ subspaces are used, each described by eigenvectors $\phi^{(j)}$ with the associated eigenvalues $\lambda^{(j)}$ for a given $q^1$ the projection out of the combined sub-spaces is given by:

$$q' = \sum_{j=1}^{n_s} \phi^{(j)} w^{(j)} + \bar{q} \quad (4)$$

with the constraints that $$E = \sum_{j=1}^{n_s} \sum_{j=1}^{N_i} \frac{(w_i^{(j)})^2}{\lambda_i^{(j)}} \quad (5)$$

be minimised. Thus if M is the matrix formed by concatenating $\phi^{(j=1,2\cdots)}$ and D is the diagonal matrix of $\lambda^{(j=1,2\cdots)}$, $$w = (DM^T M + I)^{-1} DM^T (q - \bar{q}) \quad (6)$$

and this also gives a projected version of the face $$q = (DM^T)^{-1}(DM^T M + I)w + \bar{q} \quad (7)$$

with $w_i = 0$ for those sub-spaces not required.

The first stage of implementing the invention was to subtract the overall mean from each face, so ensuring that the mean of each sub-space was as close to zero as possible. Separate principle component analyses (PCAs) were then performed upon the image sets, discarding any further difference between the group and overall means. The covariance matrices for the identity and lighting sub-spaces were calculated as $$C_T = \frac{1}{n} \sum_{i=1}^{n} (q_i - \bar{q})^T \quad (8)$$

the pose and expression used $$C_w = \frac{1}{n_o n_p} \sum_{i=1}^{n_p} \sum_{k=1}^{n_p} (q_{ki} - \bar{q}_i)(q_{ki} - \bar{q}_i)^T \quad (9)$$

where $n_o$ is the number of observations per individual, and $n_p$ is the number of individuals, and $\bar{q}_i$ the mean of individual i. Although all the eigenvectors implied by the identity, lighting and expression sets were used, only the two most variable from the pose set were extracted.

The eigenvectors were combined to form M and the projected version for each face on each sub-space found using equations 6 and 7, to give the projections $q'_j$ of face q for subspace j. This procedure looses useful variation. For example, the identity component of the expression and pose images is unlikely to be coded precisely by the identity set alone. Thus the full projection q' was calculated, and the recoded image $r_j$ included an apportional error component:

$$r_j = q'_j + \frac{(q' - q) \sum_{k=1}^{N_j} \lambda_k^{(j)}}{\sum_{j=1}^{n_s} \sum_{k=T}^{N_j} \lambda_k^{(j)}} \quad (10)$$

Figure 4:
FIG. 4 shows the first two dimensions of starting identity eigenfaces used by the invention, the eigenfaces varying only on identity.

This yielded four ensembles, each with 690 images. A further four PCAs were performed on the recoded images, (all using Equation 8) extracting the same number of components as on the previous PCA for the lighting, pose and expression sub-spaces, and all the non-zero components for the identity sub-space. These formed a new estimate of M and the original faces re-projected on this second-level estimate of the sub-spaces gave a third-level estimate and so forth. The final result with regard to the identity images are shown in FIG. 4, which shows the first two dimensions of the identity face-space (from the left, −2s:d:, the mean +2s:d:). The eigenfaces vary only on identity, the range of which has been increased. In comparison with those in FIG. 1 the facial dimensions appear to have the same identities, but are normalised for expression, pose and lighting.

Since the identity space was allowed to vary the number of eigenfaces, while the others were fixed, inevitably any noise present in the system tended to accumulate in the identity space, and would reduce recognition performance if a Mahalanobis measure were to be taken. Thus once the system had stabilized, a final PCA on $$C_B = \frac{1}{n_p} \sum_{i=1}^{n_p} (\overline{q}_i - \overline{q})(\overline{q} - \overline{q}_i)^T \qquad (11)$$

was applied to the identity projections of the complete set of images, coding 97% of the variance. This allowed a final rotation to maximize between-person variance, reducing the identity eigenvectors from 497 to 153. These rotated eigenfaces were used only for recognition.

Figure 5:
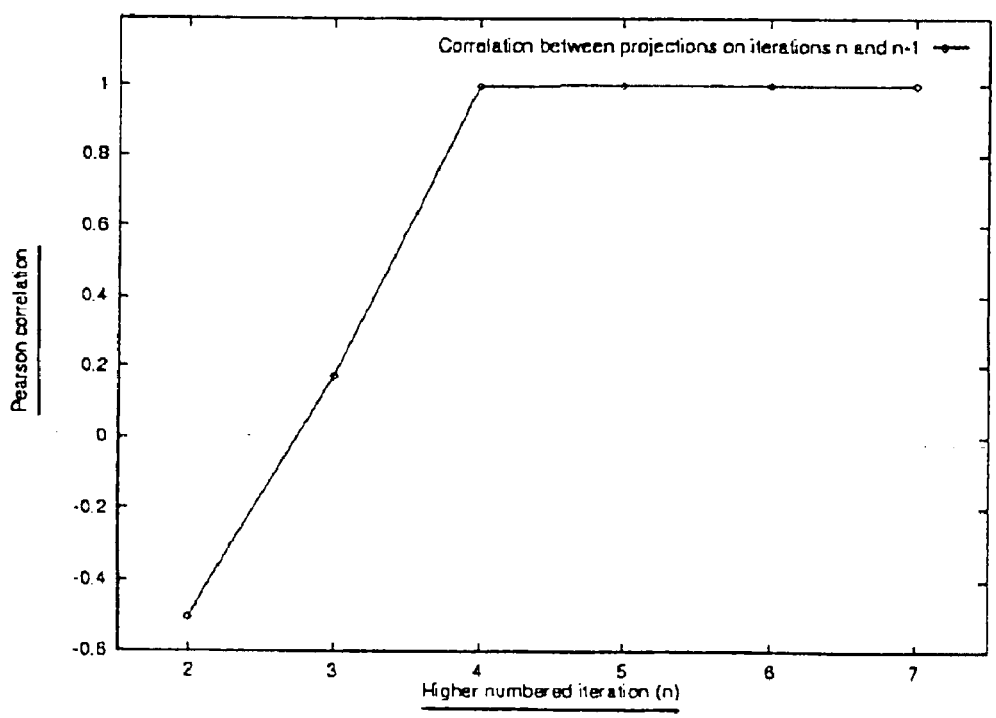
FIG. 5 is a graph illustrating the convergence achieved by the method according to the invention.

Convergence of the method was estimated by taking the Mahalanobis distances between all the images on each of the sub-spaces. A Pearson product-moment correlation was taken between the distances of successive iterations, and allowed to converge to machine accuracy, although in practice a slightly lower value would achieve the same results with reduced processing time. The method gave a relatively smooth set of correlation coefficients as shown in FIG. 5, converging in approximately seven iterations (FIG. 5 shows changes in the correlations between the Mahalanobis distances separating all the images on the multiple space between iteration n and n−1). Since only 99.99% of the variance in the ensemble to avoid problems with numerical accuracy, practical convergence was achieved by the fourth iteration.

Since the iterations involved the inclusion of information which failed to be coded on the previous iteration, it should be expected that the difference between original and projected images should decline. This should apply to both ensemble and non-ensemble images as the eigenfaces become more representative.

Figure 6:
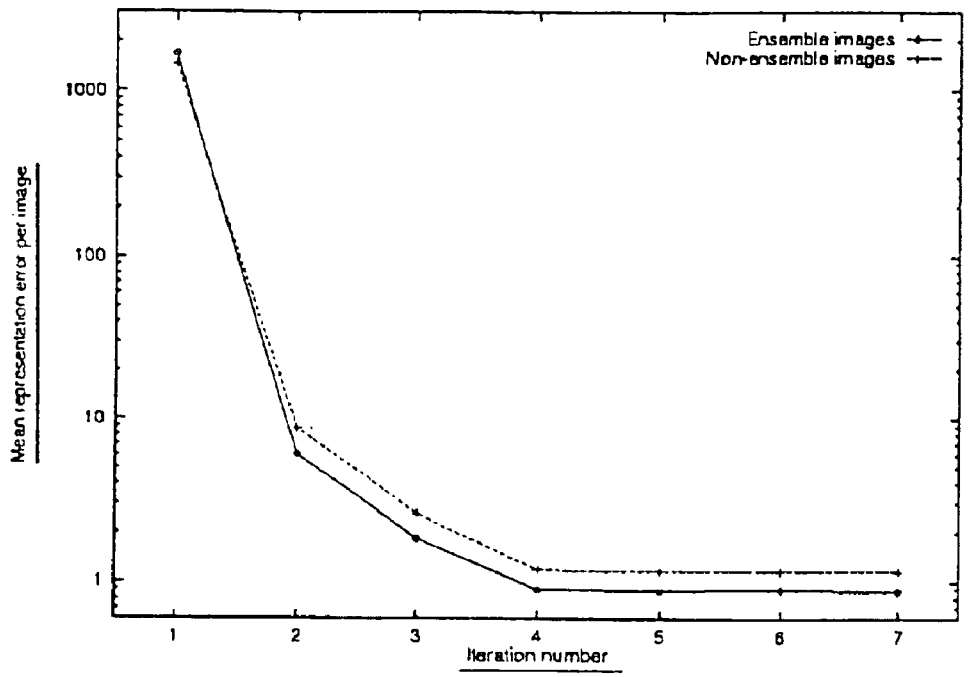
FIG. 6 is a graph illustrating mean coding errors for ensemble and test images, across iterations of the method according to the invention.

This was tested by projecting the images through the combined spaces (using Equations 6 and 7) and measuring the magnitude of the errors. This was performed for both the ensemble images and also for a large test set (referred to as 'Manchester'), first used in [A. Lanitis, C. J. Taylor, and T. F. Cootes. An automatic face identification system using flexible appearance models. British Machine Vision Conference, pages 65–74, 1994]. This consisted of 600 images of 30 individuals, divided in half: a gallery of 10 images per person and a set of 10 probes per person. As can be seen in FIG. 6, in both cases, the errors quickly dropped to a negligible level (Errors quickly decline to a negligible level in both cases. Errors on the individual sub-spaces remain high (4,000 to 11,000)). As a comparison, the two sets have mean magnitudes (total variance) of 11345 and 11807, measured on the appearance-model eigenweights.

Figure 7:
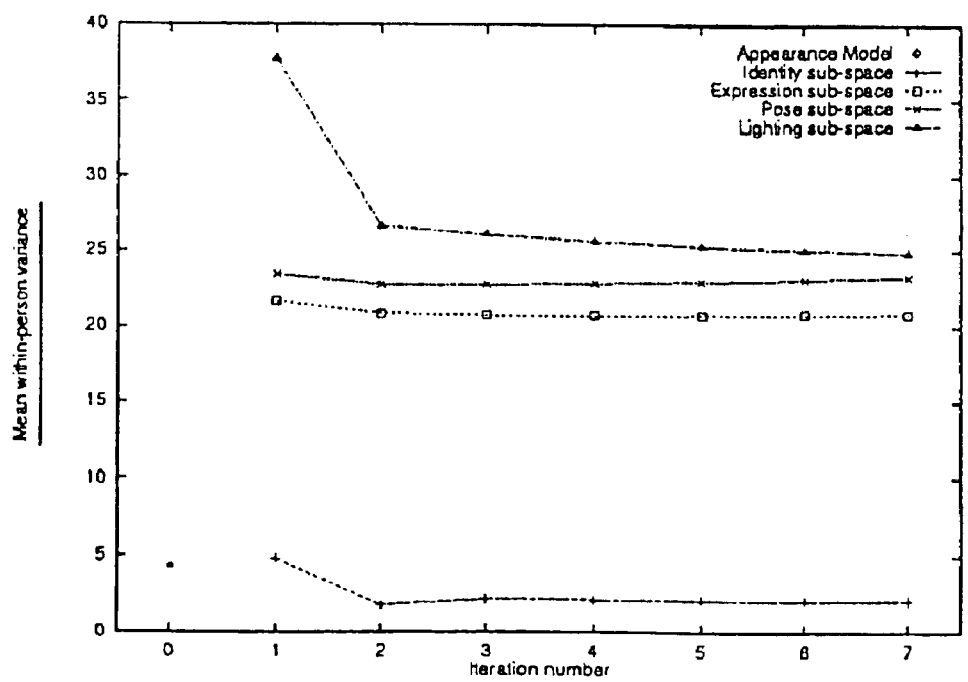
FIG. 7 is a graph illustrating mean within-person variances for the different sub-spaces as a function of iteration number.

The level of normalisation was measured on the Manchester set, calculating the identity weights using Equation 6, and finding the person-mean $\overline{w}_i$. Better removal of contaminating variance should reduce the variance for each individual, relative to this mean. The variance, $$V = \frac{1}{n_o n_p N} \sum_{i=k}^{n_p} \sum_{k=1}^{n_o} \sum_{j=1}^{N} (\overline{w}_{ij} - w_{kij})^2 \qquad (12)$$

was calculated. The results of this test in FIG. 7 show a steady decline in the identity sub-space variance (FIG. 7 shows the mean within-person variances for the different sub-spaces as a function of iteration number). The only exception to this is the value for iteration two; this is unusual in having a large increase in the number of dimensions, without an opportunity to re-distribute this variation into the other sub-spaces.

The results of projecting the faces into the other sub-spaces are shown, as is the variance in the appearance model. As might be expected, these are all higher than the identity sub-space value, and do not show marked declines as the iterations progress. Indeed, the pose variance increases slightly.

Figure 8:
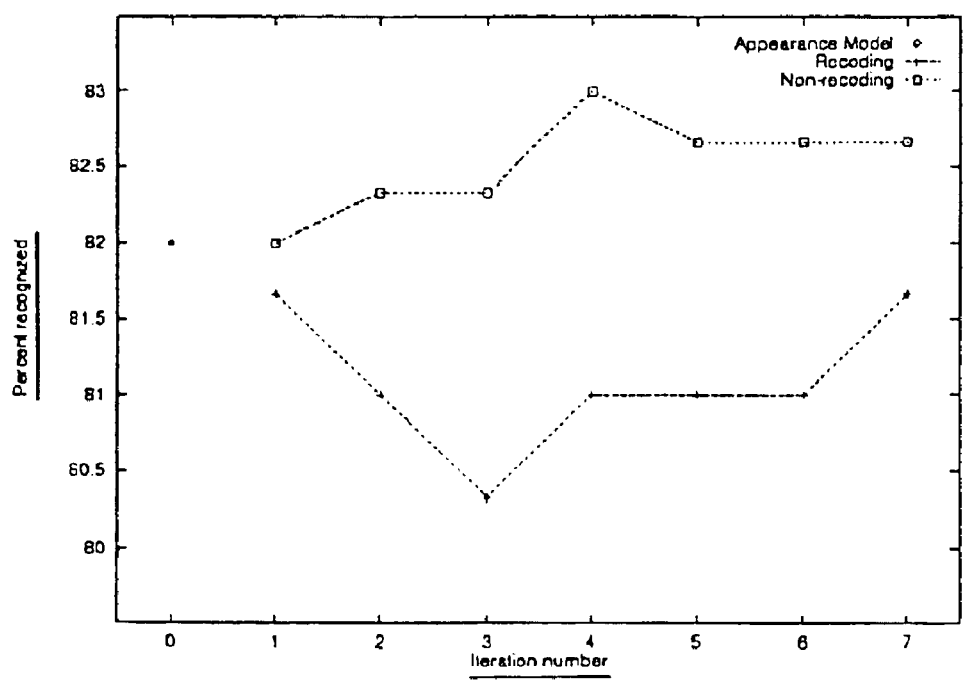
FIG. 8 is a graph illustrating recognition rates for Euclidean average-image matching.

Recognition was also tested on the Manchester set, coding the images on the final rotated space. The Appearance Model used to provide correspondences, did not give completely accurate positions, lowering recognition The pooled covariance matrix was found using Equation 9 on the $w_j$. This allowed $$d_{i-k}^2 = (\overline{w}_i - w_k)^T C_w^{-1} (\overline{w}_i - w_k), \qquad (13)$$

where $1 \leq k \leq (n_o \times n_p)$ to give Mahalanobis distances to the mean images. A recognition was scored when the smallest d had the same identity for i and k. The results are shown in FIG. 8 (which shows recognition rates for Euclidean average-image matching), and demonstrate that relative to the base condition, recognition improves by about one percent on iteration 4. Also shown are the effects of projecting the test images through the complete space to obtain the lighting—pose—expression normalised version, and then coded on the final rotated space. This does not produce an improvement in recognition. It should be noted here that there may well be contingent, non-functional correlations between parameters on different sub-spaces for individuals (for example, a consistent tendency to look up or down), whose omission may trade off against theoretically preferable eigenfaces.

Once an accurate coding system for faces has been achieved, the major problem is to ensure that only a useful sub-set of the codes are used for any given manipulation or measurement. This is a notably difficult task, as there are multiple, non-orthogonal explanations of any given facial configuration. In addition, it is typically the case that only a relatively small portion of the very large data-base required will be present in the fill range of conditions and with the labels needed to perform a simple linear extraction.

The invention overcomes these problems by using an iterative recoding scheme, which takes into account both the variance of and covariance between the sub-spaces which can be extracted to span sets of faces which vary in different ways. This yields 'cleaner' eigenfaces, with lower within appropriate group variance and higher inappropriate group variance. Both these facts reflect greater orthogonality between the sub-spaces. In addition, recognition on an entirely disjoint test set was improved, although marginally. The invention may be applied to tracking, lip-reading and transfer of identity from one person to another.

What is claimed is:

1. A method of determining face sub-spaces, the method comprising:
    a. generating a first series of initial images in which a first predetermined facial property is modified,
    b. generating a second series of initial images in which a second predetermined facial property is modified,
    c. coding each series of images according to the variance of the images to obtain an estimated sub-space for each facial property,
    d. concatenating the sub-spaces to provide a single over-exhaustive space,
    e. approximating each image of the first and second series on the over-exhaustive space to obtain approximated versions of each image on each estimated property sub-space,
    f. generating overall approximated versions of each image on the whole over-exhaustive space, g. comparing the overall approximated version of each image with the initial image to determine an error value for each image, h. sub-dividing the error value for each image into a sub-error for each estimated property sub-space in proportion to the variance of that sub-space, i. combining each sub-error for each image with the approximated version of that image on the estimated property sub-space, to obtain a new approximated version in the property sub-space for each image, j. coding the new approximated versions of the images according to their variance to obtain new estimated sub-spaces.

2. A method of determining face sub-spaces according to claim 1, further comprising approximating each image on the new estimated sub-spaces as described in steps "a" to "j" and then repeating steps "d" to "j" until the sub-spaces have stabilized.

3. A method of determining face sub-spaces according to claim 1, wherein three or more series of images are generated, a different predetermined facial property being modified in each series.

4. A method according to claim 3, wherein the predetermined facial properties are categorized as at least some of identity, expression, pose, lighting and age.

5. A method according to claim 1, where at least one further series of images is generated, a further predetermined facial property being modified in the series.

* * * * *